May 5, 1959 W. E. BRADLEY 2,885,608
SEMICONDUCTIVE DEVICE AND METHOD OF MANUFACTURE
Filed Dec. 3, 1954 3 Sheets-Sheet 1

INVENTOR.
WILLIAM E. BRADLEY
BY
ATTORNEY

May 5, 1959   W. E. BRADLEY   2,885,608
SEMICONDUCTIVE DEVICE AND METHOD OF MANUFACTURE
Filed Dec. 3, 1954   3 Sheets-Sheet 2

INVENTOR.
WILLIAM E. BRADLEY
BY
Delen V. Hazeltine
ATTORNEY

May 5, 1959 W. E. BRADLEY 2,885,608
SEMICONDUCTIVE DEVICE AND METHOD OF MANUFACTURE
Filed Dec. 3, 1954 3 Sheets-Sheet 3

INVENTOR.
WILLIAM E. BRADLEY
BY
ATTORNEY

2,885,608

SEMICONDUCTIVE DEVICE AND METHOD OF MANUFACTURE

William E. Bradley, New Hope, Pa., assignor to Philco Corporation, Philadelphia, Pa., a corporation of Pennsylvania Application December 3, 1954, Serial No. 472,983

15 Claims. (Cl. 317—234)

The present invention relates to semiconductive devices, and particularly to area-contacts to semiconductive bodies having improved injecting and/or rectifying characteristics.

In the past, area-contacts between metallic deposits and the surfaces of semiconductive materials made by evaporation or electroplating techniques have typically been characterized by a relatively small degree of asymmetry in their conduction characteristics and a negligible degree of minority-carrier injecting ability. Such contacts have in fact been of such poor rectifying and injecting characteristics that they have commonly been used as substantially non-rectifying, non-injecting "ohmic" contacts to semiconductive bodies, the slight degree of asymmetry and injection existing in such cases merely constituting an imperfection for these purposes. Even those few area-contacts intended for asymmetric conduction have usually had rectification characteristics considerably worse than those of point-contacts and much worse than those of P–N junctions, and minority-carrier injection characteristics useless for known practical purposes. For example, as rectifiers such contacts have had relatively low reverse resistances, corresponding to high saturation currents or reverse currents which continue to increase markedly with increasingly greater reverse voltages. As to the forward characteristics, the current through the contact in the forward direction has typically been roughly proportional to $e^{KV}$, where V is the voltage across the contact and K is a constant having a value of about 15 to 30, as compared to the value of about 39 which is theoretically obtainable in an ideal rectifier and closely approached by certain types of P–N junctions.

In the copending application Serial No. 395,823 of Williams and Tiley, filed December 2, 1953, and entitled "Electrical Device," and now abandoned, there is described a transistor utilizing an area-contact to a semiconductive body as an emitter of minority-carriers into the body, and utilizing another area-contact as a rectifying collector element for collecting the injected minority-carriers. Although such devices may be made by forming the area-contacts in any of a variety of ways, and although in certain embodiments of the device the intrinsic injection efficiency of the emitter can be relatively low without sacrificing greatly the performance of the device, nevertheless the better the intrinsic injection efficiency of the emitter, and the better the reverse characteristics of the collector diode, the better in general is the performance of the entire device. This transistor therefore constitutes one practical device in which it is important to provide the best possible area-contact emitter of minority-carriers, and the best possible area-contact rectifier. However there are many other applications in which a superior area-contact emitter or rectifier is highly desirable. Although chiefly of interest in connection with transistors, minority-carrier emitters have also been utilized to modulate the infra-red conductivity of semiconductive bodies for example, while high quality, area-contact rectifiers are useful in numerous applications in which excellent rectifying characteristics are desired; for example they are particularly useful in connection with the current-controlling elements of the analogue transistor. Such area-contacts are also useful as photo-responsive devices when constructed so as to be susceptible of exposure to illumination in the region of contact.

It is therefore highly desirable to provide an area-contact to a semiconductive body having superior rectifying and/or minority-carrier injecting capabilities, and to provide methods for the manufacture thereof.

Accordingly, it is a primary object of my invention to provide a new and improved form of area-contact to a semiconductive body.

Another object is to provide such a contact which is characterized by superior rectifying characteristics.

Still another object is to provide an area-contact to a semiconductive body which is characterized by superior minority-carrier injection efficiency.

A further object is to provide novel methods for fabrication of the above-mentioned improved area-contacts.

In accordance with the invention, the above objectives are achieved by providing an area-contact comprising a body of semiconductive material, an extremely thin layer of another material in highly intimate area-contact with the surface of the semiconductor, and a conductive electrode in area-contact with the layer, wherein the properties and thickness of the intervening thin layer are carefully controlled in the manner described in detail hereinafter, in relation to the properties of the semiconductive body, the conductive electrode and the surrounding surface of the semiconductor.

My invention involves as one component thereof the discovery that a principal element determining the rectifying and injecting qualities of an area-contact to a semiconductive body is the thin layer of material beneath the conductive body and in direct engagement with the semiconductor surface. Even though it is extremely thin, I have found that this layer is capable of changing the contact from highly-injecting and/or highly rectifying to poorly-injecting and/or substantially ohmic, and therefore the nature of the layer must be very carefully controlled in the fabrication process. By so controlling the nature, size and relation of this layer to the semiconductor, to the bulk metal of the electrode and to the surrounding surface layer of the semiconductor, rectifying and injecting area-contacts of unprecedented excellence have been obtained. As utilized herein, the contacting layer of the area-contact will be understood to include even the most minute traces of materials on the surface of the semiconductive body, and typically will comprise a complex or aggregate of oxides of the semiconductor, metal of the bulk of the electrode, and oxides of this metal, although other materials may also be present in significant quantities.

To produce superior rectification and injection on N-type semiconductors, this contacting layer may suitably comprise a material having many low-lying, unfilled energy-states in its energy-band spectrum, and may typically comprise an oxide layer substitutionally-activated with a metal of a suitable type to render the layer effectively P-type. Such a material is one having a low Fermi level when uncharged and out of contact with the other bodies. As one example only, I have found that an area-contact having such a contacting layer may be fabricated by jet-electrolytically etching the surface of a semiconductor with a proper solution containing metal ions, such as indium, which operate as electron acceptors in compounds containing germanium. To complete the contact, metal may be plated upon the surface layer of the semiconductor immediately upon the termination of the etching action. Preferably the plating current is applied suddenly and immediately, to prevent the entrance of dispersed metal ions interstitially into the oxide complex formed on the semiconductor surface. When plating of the complete electrode has been finished, the surface surrounding the contact is preferably etched to remove any metal-activated oxide layer in those regions, and to replace it with a substantially neutral layer. As will be dscribed hereinafter, other methods for preparing a suitable contacting layer and providing conductive contact thereto may also be employed with similarly excellent results.

To produce a superior rectifier and/or electron emitter on P-type material, the contacting layer should be opposite in characteristics to that mentioned above, and therefore should comprise a material having many filled, high-energy electron states, such as an oxide layer substitutionally-activated with a metal of a type rendering it effectively N-type. Such materials may be described as having relatively high Fermi levels when uncharged and not in contact with other bodies.

Although the foregoing remarks indicate the general properties which the layer should possess for the purposes indicated, to define the required relationship between the properties of the layer, the properties of the semiconductor and the properties of the bulk of the electrode, as well as those of the surrounding surface layer of the semiconductor, I have found it particularly convenient to utilize the concepts of chemical potentials, and to define the several criteria for rectification and injection in such terms.

The chemical potential existing in a given region of a material shall be utilized herein to designate a quantity equal to the electrochemical potential in the region, minus the electric potential in the same region, where these terms in turn have the following meanings. The electrochemical potential is defined as the amount of work per unit charge required to carry an electron from the Fermi level of the region under consideration to a location in space external to and remote from the substance under consideration and in which the electron has a fixed reference energy. The electric potential is defined as the amount of energy per unit charge required to carry a proton from the same reference location exterior to and remote from the substance, to a point within the substance and in the region under consideration having a potential equal to the average of that of a large number of points randomly distributed about the region in question and extending over ten or more atomic diameters. The chemical potential of the region is, by these definitions, therefore the work per unit charge required to move an electron from the Fermi level to the "average" energy level of which the electric potential is a measure. This chemical potential is a statistical property of the material, and for an uncharged body will have a unique value hereinafter designated the specific chemical potential of the body. However, adding or removing electrons in a given region of a body will decrease or increase its chemical potential in that region by altering the Fermi level of the material. The specific chemical potential will be utilized herein to designate the chemical potential of an isolated, uncharged material.

I have found that to provide an efficient emitter of current-carriers into a semiconductive body, it is necessary that, at the interface between the contacting layer and the semiconductor, the Fermi level of the layer under equilibrium conditions lie within about 0.1 electron-volts (e.v.) of the band in the semiconductor into which injection is to take place; i.e. for hole injection, the Fermi level of the layer should not be more than 0.1 e.v. above the valence band of the semiconductor at the interface, and for electron injection it should not be more than 0.1 e.v. below the conduction band thereof. For transistor purposes minority-carrier injection is desired, and hence the interior of the body typically possesses an excess of the carrier-type opposite to that to be injected, and the Fermi level in the interior lies near the band into which injection is to be inhibited. Since the total energy of electrons at the Fermi level must be constant at equilibrium throughout the materials in contact, efficient minority-carrier injection requires that the electron-energies of the valence and conduction bands of the semiconductor change near the surface by an amount equal to the energy-gap $\phi_G$ minus the sums of the energy spacing of the Fermi level from the nearer band in the interior of the semiconductor and the abovementioned maximum spacing 0.1 e.v. of the Fermi level from the band into which injection is to be accomplished. I have found that such changes are produced by causing the specific chemical potential of the contacting layer to differ from that of the semiconductive body adjacent thereto by an amount substantially equal to or greater than this difference ($\phi_G - S$). For hole injection the specific chemical potential of the layer exceeds that of the semiconductor, and vice versa for electron injection. In addition, preferably but not necessarily, the density of permissible electron states in the layer is relatively low for those states in the vicinity of the band from which the flow of carriers is to be inhibited. By employing these principles and criteria, area-contacts have been made which possess values of intrinsic injection efficiency, gamma, at least as great as 0.99. For example, for N-type germanium having a resistivity of about 1 ohm-centimeter, the Fermi level in uncharged portions of the semiconductor lies about 0.25 e.v. below the conduction band; since the energy gap for germanium is 0.72 e.v. efficient hole injection requires that the specific chemical potential of the layer exceed that of the semiconductor by at least 0.37 e.v.

I have further found that superior rectifiers may be fabricated by producing a contacting layer having a specific chemical potential which differs from that of the semiconductive body by an amount substantially equal to or greater than 0.6 e.v. and in a direction to move the Fermi level of the semiconductor upon contact therewith, through at least part of the forbidden band near the interface between the materials. In the case exemplified hereinbefore, in which hole emission into 1 ohm-centimeter germanium is obtained by a specific chemical potential difference of at least .37, the resulting contact is therefore also a superior rectifier which has a current density related to the applied voltage by an expression of the form $J = J_0(e^{KV} - 1)$, where $J_0$ is the reverse saturation current density of the diode and is typically of the order of one milliampere per square centimeter, and the exponent $K$ is substantially equal to 39. This has been found typical in germanium, since so long as the Fermi level in the neutral semiconductor is spaced below the conduction band by more than about 0.02 e.v., substantial injection will be obtained when the criterion for a good rectifier is met. In the case of silicon however, the energy gap is about 1.11 e.v., and a specific chemical potential difference of 0.6 e.v. which produces a superior diode is often not sufficient to fulfill also the above-cited criterion for an efficient injector, which requires that the difference in specific chemical potentials exceed the difference ($\phi_0 - S$).

Although I have found that for most contacts the contacting layer has a sufficient density of states and is sufficiently homogeneous near the semiconductor surface to permit utilization of the above criteria in the simple form shown, in some instances the contacting layer is so thin in view of its density of permissible electron-energy states that the effect of the entire area-contact on the semiconductor is in part affected by the nature of the bulk metal of the contact, and when this is so, the specific chemical potential of this metal is preferably chosen also to differ as much as possible from that of the semiconductor in the same direction as the specific chemical potential of the layer. Furthermore, the layer in general may not be entirely homogeneous, and there may therefore be some degree of approximation involved in assigning one single value of specific chemical potential to the entire layer. However, both the effects of the bulk metal and of non-homogeneity in the contacting layer may be taken into account by expressing the essential properties of the entire area-contact in terms of an effective specific chemical potential of the contact, which is equal to that value of specific chemical potential of a homogeneous contacting layer having a high density of states compared to the semiconductor which will produce the same value of chemical potential at the interface between the contacting layer and the semiconductor as does the actual contact. For the more general case then, the foregoing criterion for an emitter and rectifier may be modified to refer to the effective specific chemical potential of the contacting layer, rather than the specific chemical potential of the layer.

From the foregoing definitions, it will be clear that a material having a large specific chemical potential, such as would, for example, be suitable for a hole-emitter when placed in area-contact with an N-type semiconductor, is a material having a low Fermi level when neutral, indicating that there are a large number of low-lying energy states in the material still unfilled, and into which electrons will tend to flow from any higher-energy states in the vicinity. As will be described hereinafter in greater detail in connection with the theory of my invention, it is the flow of such electrons from the high energy states in one of the materials, such as the semiconductor in the case of N-type material, into the low-energy states of the other material, namely the contacting layer in the case of the hole emitter, which alters the electric-potential component of electron energies near the interface region in the semiconductor in such a way as to produce a barrier for one particular type of current-carrier, and therefore a rectifying contact.

It will be understood that while the foregoing criteria are applicable to that portion of the region of contact between electrode and semiconductor lying beneath the bulk metal, nevertheless satisfactory performance may be obtained when certain areas external to the conductive covering of bulk metal are of very high resistance and do not meet the above criteria. In particular, satisfactory contacts may be obtained when the specific chemical potential of the surface layer of the semiconductor surrounding the contacting layer covered by the bulk metal of the electrode differs but little from that of the body of the semiconductor, and produces neither an unusual density of holes nor of electrons, but is essentially neutral in this respect. In any case, care must be taken that the areas of the contact external to the bulk electrode do not provide a short-circuit between the bulk of the electrode and the body of the semi-conductor. In order to eliminate the possibility of such short-circuiting, and to provide a preferred type of surrounding surface, I prefer to treat the contact after deposition of the bulk metal in such a way as to convert the surrounding surface to a neutral layer, or to a layer having a conductivity-type similar to that of the body of the semiconductor while treating the bulk metal of the electrode in such a way that it does not provide a short-circuit around the contacting layer. This I have found may be conveniently accomplished by immersing the semiconductive body with its attached electrode into certain etchants which serve to passivate the surrounding surface so as to make it neutral, and/or to modify the peripheral structure of the electrode to insure that the bulk metal does not short-circuit the contacting layer. One simple method which accomplishes both of these results to a satisfactory degree is to immerse the body and contact briefly in a chemical etchant such as a mixture of hydrofluoric and nitric acids and then to wash off the etchant with distilled water, whereby the surface layer is changed to a neutral layer around the electrode, and the metal of the electrode is confined to the active contacting layer.

My preferred general method of fabrication therefore comprises treating the surface of the semiconductor so as to form a desired contacting layer thereon of the appropriate specific chemical potential, applying the conductive bulk of the electrode in such manner as to preserve the desired properties of the contacting layer, and, when necessary, treating the surface layer surrounding the bulk of the electrode so as to convert the surrounding surface layer to a neutral form.

Other objects and features of the invention will be more fully appreciated from a consideration of the following detailed description in connection with the accompanying drawings, in which:

Figures 2A to 12 are explanatory diagrams referred to hereinafter in explaining the significance of various factors affecting the performance of my device;

Figure 1:
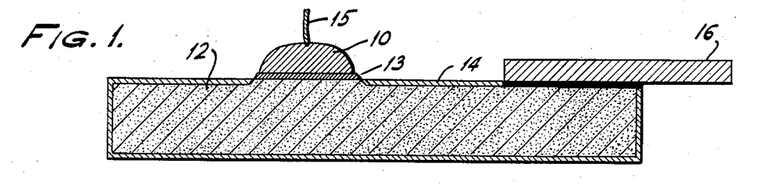
Figure 1 is an enlarged sectional view of my improved contact in one preferred form thereof.

Considering now the area-contact of my invention in more detail, in Figure 1 there are represented the several components of an area-contact in accordance with my invention, in which the precise shapes and relative dimensions have been chosen in the interests of clarity of exposition and are not necessarily to scale. A conductive body 10 is shown disposed upon a surface of a semiconductive body 12 and separated therefrom by a thin intervening layer 13 which is in extremely intimate contact with both the semiconductive body 12 and the conductive body 10. A surface layer 14 extends over the surface of semiconductive body 12 in the areas surrounding contacting layer 13, while a suitably conductive contacting lead 15 makes low resistance contact with the metal body 10 so as to facilitate connection to external elements. A base contact 16 makes substantially ohmic contact to a remote portion of semiconductive body 12.

The semiconductor 12 may be of any of a variety of semiconductive materials having appropriate resistivities and conductivity types and, in the case of a transistor for example, an appropriate value of lifetime for minority-carriers therein. For example, body 12 may suitably comprise N- or P-type germanium or silicon, preferably single-crystalline in the case of an emitter for transistor use. For the present purpose it is important that the crystal order of the semi-conductor existing in the interior thereof be maintained out to the actual surface thereof insofar as this is possible; thus any substantial disruptions or severe stresses of the crystalline surface region should be assiduously avoided. Surfaces prepared by chemical or electrolytic etching may typically have the desired undistorted form, while those prepared by grinding or polishing in general will not evidence the required degree of crystal order at the surface.

The body 10 is typically metallic, but in general any material capable of supplying the desired current carriers between lead 15 and layer 13 with low impedance will be satisfactory. There are a large variety of metals suitable for this purpose, the work function of body 10 being non-critical except insofar as is indicated hereinafter.

Surface layer 14 is preferably a neutral, or passive, layer providing a region of high resistance surrounding the periphery of layer 13.

I have found that surface-contacting layers such as 13 are extremely important in determining the electrical characteristics of an area-contact to a semi-conductive body, and that the existence of such layers, in area-contacts ostensibly directly between metals and semiconductors, explains fully the experimental results obtained with such contacts. Furthermore, I have found that the nature of the layer 13 may be so controlled as to produce rectifying and minority-carrier-injecting characteristics never before obtained or approached with area-contacts.

Before proceeding with a detailed discussion of the nature of layer 13 and methods for producing it, the nature of the factors which I have found to be controlling will be set forth. Considering first the meanings attached herein to the terms electrochemical potential, electric potential and chemical potential, a clear understanding of these terms and of their physical meanings may be obtained by reference to the accompanying figures, although it will be understood that these figures are for purposes of explanation only, and not necessarily representative of the exact conditions existing in any specific material.

Figure 2A:
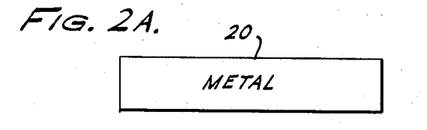
Figure 2B:
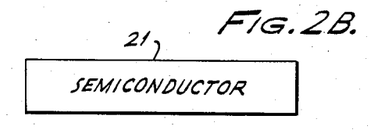

Thus, referring to Figures 2A and 2B, elements 20 and 21 thereof are, respectively, idealized representations of a body of metal, such as indium, and a body of a semiconductor, such as germanium, each uncharged and spaced from the other sufficiently that there is no substantial electrical interaction between them. Such bodies will each be characterized by a specific spectrum of energy-states for electrons therein, each state possessing a definite value of energy and capable of containing but a single electron of a given spin sense at any time. Electrons in the materials tend first to fill the lowest unfilled energy-states, which may be thought of as those nearest positively-charged atomic nuclei. The highest state which is occupied therefore depends upon the number of electrons in the body.

Figure 3A:
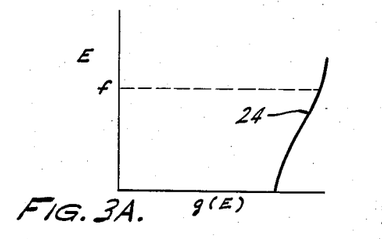

In some materials such as the typical metals, nearly all energies of quantum states are permissible, and the spectrum of permissible electron states is substantially continues as shown by solid curve 24 in Figure 3A, wherein the energy of electron states is plotted vertically and the density of permissible states per unit volume is represented by a function $g(E)$ plotted horizontally.

Figure 4A:
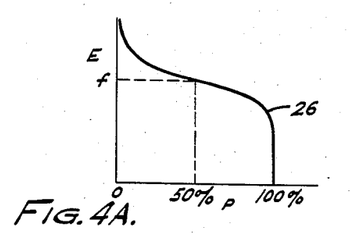

Further, the total number of electrons in an uncharged metal is equal to the number of unbalanced charges in the nuclei of its atoms, which in turn is a characteristic of the material. These electrons are distributed among the possibile energy states according to a distribution known as the Fermi-Dirac distribution, which is represented in Figure 4A by solid curve 26, wherein ordinates represent electron energy and abscissae represent the probability of finding states of each energy filled. The energy corresponding to a state for which the probability of being filled equals 50% is defined as the Fermi level. The Fermi level moves upward when electrons are added to the body to charge it, and downward when they are removed. Since the number of electrons in the body is the integral of the product of the density-of-states function $g(E)$ and the Fermi-Dirac distribution curve, with respect to energy, evaluated from zero to infinity, the change in Fermi level with change in charge of the body depends upon the density of states in the vicinity of the Fermi level, being small for a large density of states and vice versa. Thus, since the metal 20 has a large densty of states at all energies, adding or removing electrons from it alters the Fermi level only very slightly. For the purpose of the present description, it will be assumed that the Fermi level of the metal is as shown at $f$ in Figures 3A and 4A.

Figure 3B:
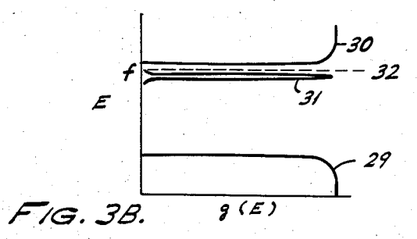

In the crystalline semiconductive body 21, the densities of permissible energy states are not continuously distributed, but instead there will typically be a "forbidden band" of energies which electrons in the material may not possess, as shown in Figure 3B. Here again the ordinates represent electron energies and the abscissae represent densities of permissible energy states $g(E)$ for electrons in the semiconductor. In the present example it will be assumed for convenience that the semiconductor is N-type germanium. The aggregate of energy-states below line 29 is termed the valence band; that above line 30 is called the conduction band; and the region between lines 29 and 30 is designated the forbidden band. The narrow band 31 lying slightly below the conduction band will be designated the impurity band, and is due to impurity atoms dispersed through the germanium.

With a sufficient density of states in the impurity band, the Fermi level of the semiconductor when uncharged will typically lie just below the conduction band as shown by dotted line 32. It is significant that, since the density of states in the "forbidden band" is substantially zero except for impurity levels, removing electrons from the semiconductor to charge it positively will be accompanied by a relatively great lowering of the Fermi level.

Figure 4B:
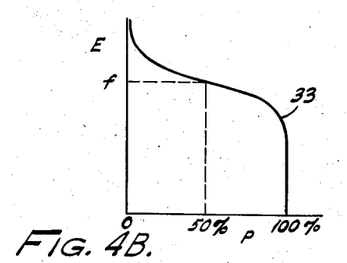

Line 33 of Figure 4B represents a typical Fermi-Dirac distribution curve for semiconductor 21 when uncharged, plotted to the same ordinate scale and for the same temperature as Figure 4A. As shown, the Fermi level of the semiconductor is slightly higher than that of the metal 20.

Figure 5A:
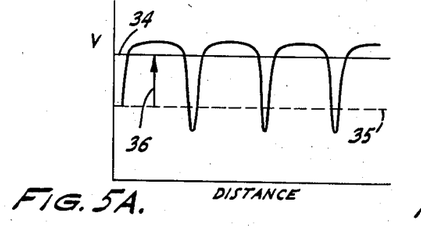

The definition of the terms electrochemical potential, electric potential and chemical potential of a body as utilized herein may now readily be set forth in terms of the foregoing accepted properties of materials. Although not necessary to such definitions, it is helpful in obtaining a physical conception of the significance of these terms to consider them in relation to Figures 5A and 5B, which are presented for the purposes of exposition only and are not intended to be quantitatively definitive of the exact conditions existing in the metal or semiconductor, except to the extent indicated herein. Figure 5A is an idealized plot of the one-dimensional-variation of the actual electron potential as a function of distance within a material such as metal 20, while Figure 5B indicates a similarly idealized plot for semiconductive body 21. As shown in Figure 5A, the potential varies periodically through the body of the metal with a periodicity of the order of the space rate of repetition of the atomic structure of the metal. Thus there are relatively large, extremely localized variations in actual electric potential throughout the crystal depending upon position with regard to the immediately adjacent nuclei of the constituent atoms. Thus while there is an average potential through the body indicated by line 34, corresponding to the average of the potential through at least one element in the periodic structure of the metal, if examined on a sufficiently small scale, periodic local variations from this average value will be discerned. The energy of the Fermi level, represented by dotted line 35, will in general differ from the average potential indicated by line 34, and as shown lies substantially below it.

The term "electric potential" as utilized herein will be defined in such a way as to vary with variations in the average potential shown by line 34. Thus the term "electric potential" as utilized hereinafter designates the amount of energy per unit charge required to move a proton from a reference location exterior to and remote from the substance, to a point having the average potential indicated by line 34. For the purposes of this definition, the point of average potential in the region under consideration may be defined as a point having a potential equal to the average of the potentials of a large number of points randomly dispersed through a spherical volume having a radius of at least 10 atomic diameters in the region under consideration. The line 34 in Figure 5A may therefore be considered as representative of the electric potential of the region of the body 20.

The term "electrochemical potential" will be utilized herein to designate the amount of energy per unit charge required to carry an electron from the Fermi level of the region under consideration to a reference energy state having zero kinetic energy at a location in space external to and remote from the substance under consideration.

For convenience, it will be assumed herein that the reference energy for the electric potential and for the electrochemical potential is the same. Therefore, the position of the Fermi-level 35 in Diagram 5A is indicative of the electrochemical potential of the substance.

A third term which is of importance in the present connection is the chemical potential, which as utilized herein may conveniently be defined as equal to the electrochemical potential minus the electric potential, as both terms are defined hereinabove. Referring to Figure 5A, it is therefore convenient to consider the chemical potential as equal to the work per unit charge required to move an electron from the Fermi level to the "average" energy level of which the electric potential is a measure. Thus the chemical potential may be thought of as proportional to the difference 36 between the level 34 and the level 35 in Figure 5A.

Figure 5B:
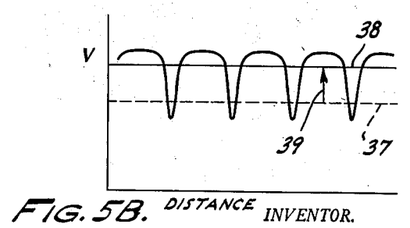

Figure 5B similarly indicates by lines 37, 38 and 39 the electrochemical potential, the electric potential and the chemical potential, respectively, of the semiconductive body 21. It is noted that the Fermi level and chemical potential of the semiconductor represented in Figure 5B are approximately the same as those of the metal shown in Figure 5A, the semiconductor having a slightly higher Fermi level and a slightly smaller chemical potential.

Both the electric potential and the chemical potential as defined herein may vary from substance to substance as shown, and furthermore may vary within the same substance and within substances in electrical contact with each other. It is therefore convenient to define also the specific chemical potential of a substance, which is that value of chemical potential characterizing the substance in its neutral, uncharged condition. The particular values of chemical potential shown in Figures 5A and 5B are therefore the specific chemical potentials of the materials 20 and 21, respectively, and characteristic of the respective substances.

If the idealized metal body 20 and the idealized semiconductive body 21 were to be placed against each other over a substantial area, as by moving them together in the arrangement shown in Figures 2A and 2B, it might be expected that a transfer of charge would take place between the two bodies until the Fermi level of the two materials were identical, and that this transfer would be predominantly by a passage of electrons from semiconductive body 21 to metal body 20 in view of the higher Fermi level of body 20 as shown in Figures 5A and 5B for the particular example represented there. This net change in electronic charge would result in a deficit of electrons in the semiconductor near the boundary, producing an electric potential barrier to the flow of further electrons. Under these conditions it might be expected to find a direct correlation between the difference in Fermi levels of the two materials and the height of the potential barrier; for the case shown in the drawings, a low barrier for electrons would be expected to result.

However, I have found that in a real contact utilizing a metal and a semiconductor having the properties shown in Figures 5A and 5B, placing of the bulk metal against the semiconductor may result in a high barrier for holes, a high barrier for electrons, or no barrier at all. I have further found that a theory based on the foregoing simple mechanism, or on so-called "surface state" considerations, is entirely inadequate to describe realistically what actually takes place when a metal is moved into contact with a semiconductive body, and that the reason for the large discrepancies between previous theory and practice is that the assembly formed when a metal is actually moved into area-contact with a semiconductive surface does not comprise a simple, homogeneous metallic body in direct contact with a semiconductor but, instead, inevitably constitutes a three-element system comprising the bulk metal of the electrode, the actual surface of the semiconductor, and an intervening layer of another material actually contacting the semiconductor. This layer, even though often extremely thin, can and usually does control the barrier-producing capabilities of the contact. I have found that the thickness, chemical potential, and densities of state of this surface layer of the electrode may be controlled in predictable manner to alter the characteristics of the contact and thereby produce area-contacts having rectifying and injecting characteristics of a controllable nature. In particular, I have found that by controlling this intervening layer in manners fully described hereinafter, a contact having excellent minority-carrier injecting capabilities, and also highly-superior diode characteristics, may be obtained reproducibly and predictably.

The fundamental structure involved in an actual, practical contact is therefore as described previously with reference to Figure 1, wherein the complete electrode making area-contact with semiconductive body 12 is actually the combination of the bulk portion 10, normally of metal, and a surface-contacting layer 13 in actual engagement with the semiconductive body. The distribution of charges and the electric potential variations existing in such a system of contacting bodies, and the reasons for these distributions, will become apparent from the following discussion thereof.

Figure 6:
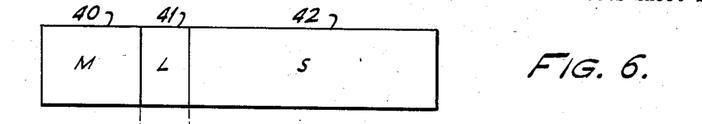

In discussing the essential properties of such a contact, it is convenient to represent the contact by the general three-element assembly shown in idealized form in Figure 6, wherein 40 represents the metal, 41 represents the contacting layer, and 42 the semiconductive body.

Figure 7:
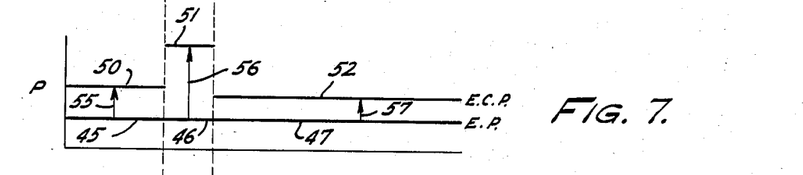

In Figure 7, wherein ordinates represent potentials and abscissae represent distances corresponding to positions in the three-element assembly of Figure 6, there are shown examples of possible values of the electro-chemical potentials and the electric potentials which the several elements of Figure 6 may possess when separated and isolated from each other. Thus lines 45, 46 and 47 represent the electric potentials of bodies 40, 41 and 42, respectively, when isolated, while lines 50, 51 and 52 represent the corresponding electro-chemical potentials before contact. As shown, the electric potentials of the bodies when isolated are substantially the same, while the electro-chemical potential of the semiconductor as shown is slightly less than that of the metal, and that of the layer region 41 is much higher than either. The specific chemical potentials of the substances are therefore as shown by arrows 55, 56 and 57 for bodies 40, 41 and 42 respectively.

Figure 8:
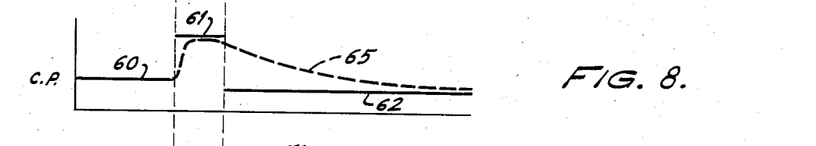

In Figure 8, the specific chemical potentials of the three elements, and the chemical potentials therein after contact, are plotted as ordinates, with abscissae representing distance to the same scale as in Figure 6. Thus solid lines 60, 61 and 62 indicate the specific chemical potentials of elements 40, 41 and 42, while dotted line 65 indicates a typical manner in which the chemical potential varies between its specific values after contact between the elements.

The exact manner in which the chemical potential varies will be described more fully hereinafter, and it suffices here to point out that in regions sufficiently remote from a boundary between materials the chemical potential substantially equals the value of specific chemical potential of the material, and that in the vicinity of boundaries the chemical potential varies continuously between its specific values. The mechanism producing the modifications near a boundary is a net transfer of electrons from the material having the lower specific chemical potential to the material having the higher chemical potential, whereby the Fermi levels of the two materials adjust themselves until they are equal. The less the density of permissible electron-energy states in the vicinity of the Fermi level of the material when uncharged, the more will the Fermi level of that material change in the adjustment process.

For the typical case illustrated in Figure 8 in which the density of permissible states near the Fermi level in the layer is many times greater than the density of states in the semiconductor near the Fermi level, the chemical potential of the layer at the interface is substantially the same as the specific chemical potential of the layer, and the barrier height $\phi_0$ is equal to the differences in specific chemical potential of the layer and the semiconductor. As described, with the specific chemical potentials of the layer greater than that of the semiconductor, the barrier is in the direction to inhibit the passage of electrons, and produces strong rectification on N-type material.

Figure 9:
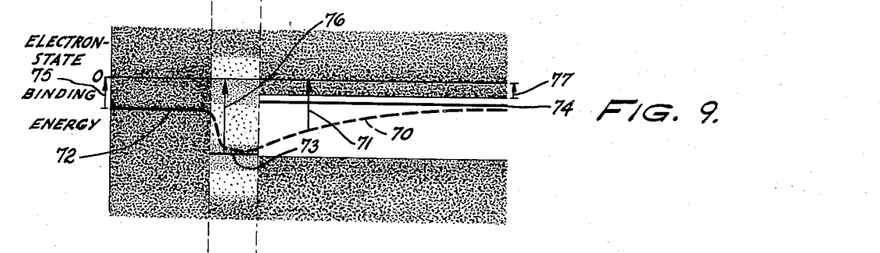

In describing the relation between the chemical potentials of bodies in contact and the energies of electrons therein, as well as for other expository purposes, I have found the type of diagram shown in Figure 9 to be especially helpful. This diagram is a plot of the electron-state binding energies in the metal, semiconductor and intervening layer, where the term "electron-state binding energy" indicates the work per unit charge performed in carrying an electron from any state in a region to the reference state for that region. The zero reference state, designated by line 0, corresponds to that state in which the electron is found with substantially equal probability over a region of space including at least several atoms around the point in question, and in which the electron has negligible angular momentum. These binding energies are the same when the three bodies are separated as when they are in contact, since they are entirely characteristics of the materials.

The densities of permissible electron states are indicated in this diagram by the density of shading, heavy shading indicating a high density of states. As shown, the density of states in the metal is high for all energies; in the semiconductor the density is high in the valence, conduction and impurity bands and substantially zero at other regions in the "forbidden band," while in the contacting layer there are very high densities of state well above the conduction band and below the valence band of the semiconductor, moderate densities in the vicinity of the conduction and valence bands limits and a lesser but substantial density of states at other energies in the regions shown. It will be understood that the densities of state extend above and below the extremes shown by shading in the drawing, but as a convenience in exposition have not been shown.

Dotted line 70 represents the locus of those energy states corresponding to the Fermi level at each point along a line through the three bodies, when the bodies are in contact. Thus any point on curve 70 indicates by its ordinates the energy state which has half a chance of being filled at the point in the material given by the abscissae of the point. On this diagram, the chemical potential is indicated by the distance 71 between the Fermi level and the zero reference state, corresponding to the work per unit charge required to take an electron from the Fermi level to the zero reference state. 72, 73 and 74 are then the states corresponding to the Fermi level in the metal, layer and semiconductor respectively, when neutral and isolated, i.e. before placing them in contact. For convenience, these will be referred to hereinafter as the neutral Fermi levels. The corresponding specific chemical potentials are indicated by arrows 75, 76 and 77.

When the three materials are in contact, the large specific chemical potential of the layer 41 causes electrons to flow into it from both metal and semiconductor, so as to fill the low-lying empty states in the layer above the Femi level 73. This transfer of electrons is limited principally to the boundary regions because of the opposing electric field arising from the transfer. The net charge added or subtracted is therefore greatest at the boundary in each material and falls off to zero in the interior. Although the charge taken from one body near a boundary must equal that added to the adjacent body, the effects of the charge in changing the position of the Fermi level are in general quite different for the two materials. In the case of the semiconductor, the loss of electrons to the layer corresponds to a large lowering of the Fermi level in the positively-charged region since, as indicated by Figures 3B, 4B and 9, the filled states in the semiconductor lying above the Fermi level of the layer are substantially only those in the small impurity band, and even removal of a relatively small number of electrons is sufficient to empty this small number of filled states and to reduce the Fermi level markedly, as shown by line 70 as it enters layer 41 near the neutral Fermi level of the layer. For the metal, the density of states above the neutral Fermi level of the layer is great, so that loss of electrons to the layer has little effect on the Fermi level in the metal, as shown by the very small modification of the Fermi level in the charged region of the metal immediately adjacent the layer. The Fermi level in the layer 41 changes to an intermediate degree greater than in the case of the metal and less than in the case of the semiconductor.

I have found that the precise nature of this variation of the Fermi level curve on a diagram of electron-state binding energies may be expressed definitively in simple mathematical form, in view of the following considerations. The Fermi function $f_{(E-E_f)}$, defined hereinafter, expresses, for all electron states the probability of finding an electron state having energy E occupied by an electron when the Fermi level is at the energy level $E_f$. The number of electrons in any given state in a region is therefore the product of the density of stages $g(E)$ evaluated for that state multiplied by the Fermi function evaluated at that level. For any given position of the Fermi level, the number of electrons in the region is therefore the integral with respect to energy of the product $g(E)f_{(E-E_f)}$ evaluated from zero to infinity. For the neutral Fermi level therefore:

$$N = \int_0^\infty dE f_{(E-E_f)} g(E)$$

where N is the total of electrons in the region, $f_{(E-E_{fn})}$ is the Fermi function for the neutral condition, and E is energy of state. The Fermi function $f_{(E-E_f)}$ utilized in the expression is given by the following formula:

$$f_{(E-E_f)} = \frac{1}{1+e^{\frac{q}{KT}(E-E_f)}}$$

where $q$ is the electronic charge, $k$=Boltzmann's constant, $T$=absolute temperature, $E$=energy potential and $E_f$ is the Fermi energy potential. The difference $\Delta N$ in the amount of electrons is the region when the Fermi level is changed from its neutral position to a position corresponding to a state energy $E_f$ is:

$$\int_0^\infty dE g(E)[f_{(E-E_f)} - f_{(E-E_{fn})}]$$

The net unbalanced charge Q in any region is $-q\Delta N$, where $q$ is the electronic charge. The relation of Q to the electron electric potential is given by Poisson's equation, which states:

$$\Delta^2 \phi = Q/e_0$$

where $\Delta^2$ indicates the sum of the second partial derivatives with respect to each of three mutually orthogonal axes in the region and $e_0$ is the dielectric constant of the material. Since changes in electric potential at equilibrium are equal and opposite to changes in $E_f$, the binding energy of the Fermi level, the following is true:

$$\Delta^2 E_f = -q/e_0 \int_0^\infty g(n) dE [f_{(E-E_f)} - f_{(E-E_{fn})}]$$

Designating horizontal distances through the bodies 40, 41 and 42 by X, $\Delta^2 E_f$ may be replaced by $$\frac{d^2 E_f}{dX^2}$$

and the relation then defines the curvature of the Fermi-level-locating line 70 in Figure 9. From this the equation for the line 70 in various cases can be found, given appropriate values of the quantities in the equation, as will be exemplified hereinafter. Variations in curve 70 are numerically equal to variations in the chemical potential of the material, and the foregoing therefore constitutes a method for determining the variations in chemical potential through the three bodies in contact.

The significance of the exact nature of the variation of the chemical potential in the several bodies will be appreciated when it is realized that, since the electrochemical potentials of the bodies after contact must be equal, the variation of electric potential through the bodies in contact must be the negative of the variation in the chemical potential. Furthermore, since the total potential of an electron in any given energy-state in the spectrum of permissible energy states of the material equals the specific binding energy of its state plus the energy due to the electric potential, the conventional electron-potential diagram for a neutral semiconductor, in which increases in electron-potential are plotted upward, is modified to the extent of the variation in chemical potential.

Figures 10, 11:
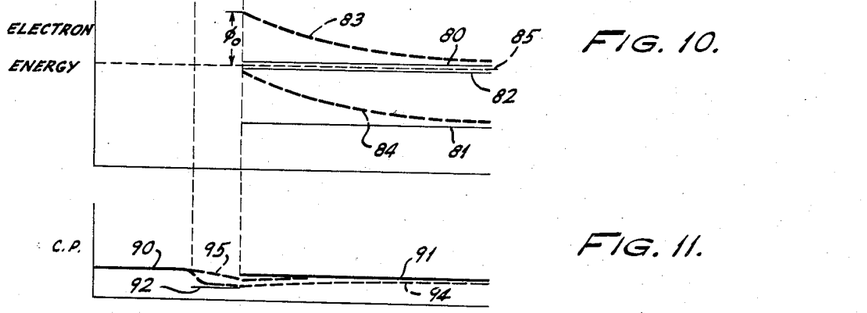

As an example, Figure 10 shows by solid lines 80, 81 and 82 the total conduction-band electron-potential, the total valence-band electron potential and the Fermi level of the semiconductor before contact, and in dotted lines 83, 84 and 85, respectively, the corresponding values after contact. $\phi_0$ represents the electron-energy barrier height, and is equal to the difference between the value of the chemical potential at the interface between the layer and the semiconductor, and the specific chemical potential of the semiconductor. For the typical case shown in Figure 9, the chemical potential at the interface is substantially equal to the specific chemical potential of the layer 41, and the barrier height $\phi_0$ is therefore substantially equal to the difference between the specific chemical potentials of layer and body.

It is particularly significant that even though the difference in the neutral Fermi levels of the metal and semiconductor do not differ by an amount sufficient to produce a substantial barrier in the semiconductor, the use of a contacting layer 41 having a suitably large chemical potential, corresponding to a large number of low-lying empty electron-energy states, has converted the contact into one providing a high barrier to electron flow and hence a superior rectifier, and, because of the juxtaposition of the Fermi level of the bodies in contact to the valence band at the interface between layer and semiconductor, a superior emitter of holes into the semiconductor.

In connection with the determination of the exact nature of the chemical potential variations, two cases of importance are, first, the case in which the neutral Fermi level lies in a band having substantially zero density of states, and secondly the case in which the density of states in the vicinity of the neutral Fermi level is substantially constant. In the first case the quantity $\Delta^2 E_f$ in Equation 1 is approximately constant, so that $E_f$ and hence the chemical potential follows a parabolic curve; this is the usual case for the forbidden band in a semiconductor. In the second case, $E_f$ and hence the chemical potential has an exponential form:

$$A \exp\left(\sqrt{\frac{qc}{e_0}}X\right) + B \exp\left(-\sqrt{\frac{qc}{e_0}}X\right)$$

where A and B are constants, C denotes the number of electron states per electron volt of energy per cubic centimeter, $q$ is the electronic charge, $e_0$ is the dielectric constant of the region and X is distance in centimeters; this is the usual case for the contacting layer.

Considering now the effects of changes in specific chemical potential, thickness and degree of activation or state density of the contacting layer 41, Figure 11 is a plot of chemical potential in bodies 40, 41 and 42, for the case in which the specific chemical potentials 90 and 91 of metal 40 and semiconductor 42, respectively, are the same as in the example illustrated in Figure 8, but the specific chemical potential 92 of the layer 41 is less than that of either. For the same density of states as in the previous example shown in Figure 8, the chemical potential varies substantially as shown by broken line 94. In this case the chemical potential at the interface between layer and semiconductor is slightly less than the specific chemical potential of the semiconductor, and hence the electron-energy barrier is low and is a barrier for holes rather than electrons. Such a barrier on N-type material is not useful as a rectifier or minority-carrier injector.

Broken line 95 indicates the manner in which the chemical potential varies in the layer when the density of states is low in the layer. In this case the curvature of the line is so slight that the layer has little effect on the chemical potential, and again the contact is a very poor rectifier and injector of minority-carriers.

Figure 12:
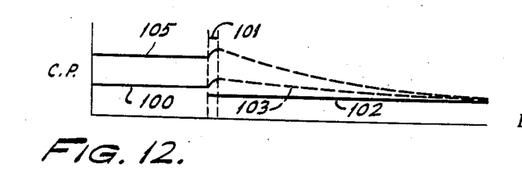

Figure 12 is a plot of chemical potential illustrating the effect of making the layer 40 very thin, i.e. 10 atomic diameters or less in thickness. In a first case in which the specific chemical potential lines 100, 101 and 102 for the metal, contacting layer and semiconductor respectively, as well as the density of states, are the same as for Figure 8, the chemical potential indicated by line 103 rises only slightly in the layer because of its extreme thickness, and only a very slight barrier results. However, if the metal 40 has the higher specific chemical potential shown by line 105, the barrier is substantially greater in the semiconductor.

Thus, where the layer is extremely thin, or the density of states is low in the layer, the specific chemical potential of the metal exerts an appreciable effect on the barrier height. However, the effective specific chemical potential of the layer, which is the chemical potential of the layer at the boundary with the semiconductor, is still determinative of the barrier height, and the barrier height is in fact equal to the difference between the effective specific chemical potential of the layer and the specific chemical potential of the semiconductor.

The foregoing is therefore descriptive of the manner in which the specific chemical potentials of the bodies in contact determine the barrier height and injecting properties of a contact in accordance with the invention. Although exemplified with particular applicability to N-type germanium, the relations indicated are generally applicable, and for example are directly applicable to the semiconductors of principal present interest for transistors and rectifiers, namely N- and P-type germanium and silicon. From the foregoing it will be apparent that in the case of P-type materials the specific chemical potential of the semiconductor is the binding energy corresponding to its neutral Fermi level, which in turn is nearly as low as the top of the valence band. For silicon, the energy gap is greater than in germanium, so that a greater barrier height is required to alter the position of the Fermi level from one extreme of the forbidden band to the other, as required for superior minority-carrier injection.

The extreme importance of even very thin contacting layers of other materials in contact with the surface of a semiconductor may be demonstrated by the following procedure. A grown P–N junction in 1 ohm-centimeter germanium, having a surface at, and on either side of, the junction which is clean except for a layer of inert germanium dioxide, is scanned by the beam of a television flying-spot scanner arranged to sweep across surface areas at, and on either side of, the junction. The intensity of the beam is modulated at a high frequency such as 3 megacycles per second, and a load resistor connected between opposite sides of the junction. The voltage developed across the load resistor is then an indication of the photoresponse of the semiconductor, and is applied through an appropriate amplifier having a passband located at 3 mc., to a television cathode-ray-tube monitor synchronized with the scanner, so as to display the surface of the germanium with a brightness proportional to the photo-response produced by the impingement of the beam at each point thereof.

When the surface scanned by the beam is exposed to normal, uncontaminated air during the scanning operation, the monitor shows a bright line at the junction, since when the beam impinges at or very close to the junction, the hole-electron pairs produced are "sorted" by the junction, the holes moving into the P-type material and the electrons into the N-type material, producing a current through the external load resistor. However, with the neutral surface, impingement of the beam on surface regions spaced from the junction by more than about 4 mils produces no substantial photo-response, and substantially no indication on the monitor.

If a surface-layer having P-type characteristics is formed on the exposed surface, substantial photo-response is obtained on the side of the junction made up of N-type body material, and this response exists for distances from the junction which are quite large; the larger the chemical potential of the surface layer, the further the corresponding bright region on the monitor display extends away from the junction. Meanwhile, no substantial change occurs in the photo-response of the surface on the side of the junction containing the P-type body material. When a layer of low chemical potential is formed on the surface, the opposite situation exists, and the bright region extends from the barrier onto the P-type side of the junction as displayed on the monitor.

I have found that the characteristics of the surface of such a body of semiconductor may be changed rapidly in chemical potential merely by changing the atmosphere from one containing chemically-reducing contaminants to one containing oxidizing contaminants and vice versa. For example, when the neutral surface described above is placed near an open bottle of iodine, the monitor shows a large bright area on the side of the junction having N-type body material, indicating a layer of large chemical potential. When an opened bottle of ammonium hydroxide is placed near the surface, the bright area on the monitor retreats from the N-type side of the body toward the junction, and then advances on to the P-type side within a few seconds, indicating a layer having a low chemical potential on the surface. Thus dense populations of either free electrons or free holes can be produced immediately within the semiconductor, by exposure to different atmospheric contaminants for short periods of time. So sensitive is such a surface to ambient conditions that strong changes in the delicate balance of surface-conductivity type may be preduced by breath or other air currents.

Since iodine is a substance tending to produce a large chemical potential and a low Fermi level, i.e. a large number of low-lying energy states which give rise to a high affinity for electrons, it constitutes an oxidizing agent. Its effect on the surface of the germanium is therefore to abstract electrons even from the valence band of the germanium, producing hole injection and a potential barrier. Ammonia gas, on the other hand, is a material which tends to give up electrons and acts as a reducing agent, and therefore has the opposite effect on the surface so as to provide electron injection, a barrier for holes and an effectively N-type surface.

The foregoing experiment indicates the extreme sensitivity of the surface of a semiconductive body to very thin layers of other materials in direct and intimate contact therewith. It further demonstrates that, in accordance with the foregoing criteria, materials with sufficienly large chemical potentials produce barriers for electrons, while those with sufficiently small chemical potentials provide barriers for holes.

Considering some typical types of compositions suitable for use as contacting layer 13 in Figure 1, and some typical methods for producing them, one form of layer which has been found unusually satisfactory for use on N-type germanium is a layer having a relatively high density of acceptor-metal atoms substitutionally dispersed through an oxide agglomerate. This type of layer has a high specific chemical potential compared to that of N-type germanium, and, when sufficiently-strongly activated by the metal, provides an excellent rectifier and hole injector.

Figure 13:
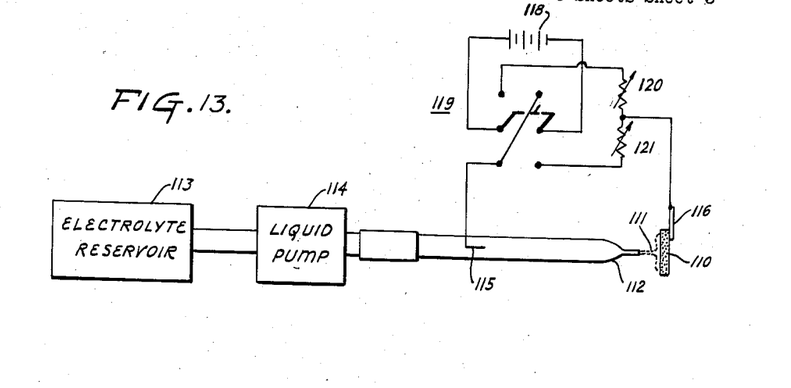
Figure 13 is a diagrammatic representation, partly in block form, of apparatus for fabricating an area-contact in accordance with the invention.

To provide such a layer, with the bulk metal 10 suitably disposed thereon, the apparatus of Figure 13 may conveniently be utilized. Semiconductive body 110 is impinged by a jet 111 of an electrolyte ejected from glass nozzle 112 and supplied from electrolyte reservoir 113 by means of liquid pump 114 and appropriate tubing. A current of controllable magnitude and polarity is passed between an inert electrode 115 in the electrolyte and a low-resistance contact 116 to body 110, by means of battery 118, double-pole, double-throw switch 119 and variable resistors 120 and 121, connected as shown. With the switch thrown to its upward position, body 110 is positive with respect to jet 111, and for downward position the jet body is negative with respect to the jet. Such arrangements for directing a jet of electrolyte against a semiconductive body and for passing a controlled current of either polarity between jet and body are described fully in the copending application of John W. Tiley and Richard A. Williams, Serial No. 472,824, filed December 3, 1954, and hence need not be described here in further detail except as to the effects of the electrolyte and currents upon the contacting layer formed thereon in the process.

To provide the desired layer, I prefer in the example to utilize as the electrolyte a substance which produces etching of the surface of the body 110 when the body is positive, and which contains a relatively large concentration of metal ions of a type to act as substitutional acceptors in germanium. A suitable electrolyte is a 0.1 normal solution of indium trichloride in water with sufficient hydrochloric acid added to give a pH of 1.5. With the switch 119 in the upward position to make body 110 positive, the current may be adjusted to about 1 milliampere for a three-mil diameter jet, and etching of the body then occurs under the jet. In this operation, a very thin germanium oxide layer is continuously formed on the germanium surface. Since indium ions are also present at the surface in relatively high concentrations, the freshly-forming oxide is interspersed with substitutional indium ions. When the switch 119 is then thrown to the downward position to make body 110 negative and to supply a current of about 0.7 milliampere, indium is plated upon the underlying surface layer to provide the bulk metal 10 of Figure 1. The contact may then be immersed in a chemical etchant such as equal amounts of 48% HF and 70% $HNO_3$, diluted two-to-one with water. By this process the strongly-activated layer of high specific chemical potential is removed in the area surrounding the bulk metal 10 and replaced with the inert layer 14 of Figure 1. The resultant structure is an excellent rectifier and emitter of holes.

In the foregoing process, the specific chemical potential and density of states in the contacting layer 13 are dependent upon the concentration of indium ions in the electrolyte, and the thickness depends upon the acidity, low-acid solutions providing thinner layers. The thickness of the layer should not be so great as to introduce series resistance for current flow through the contact which will seriously degenerate the electrical performance of the contact. By varying these factors, substantial difference in the electrical characteristics may be produced.

Figure 14:
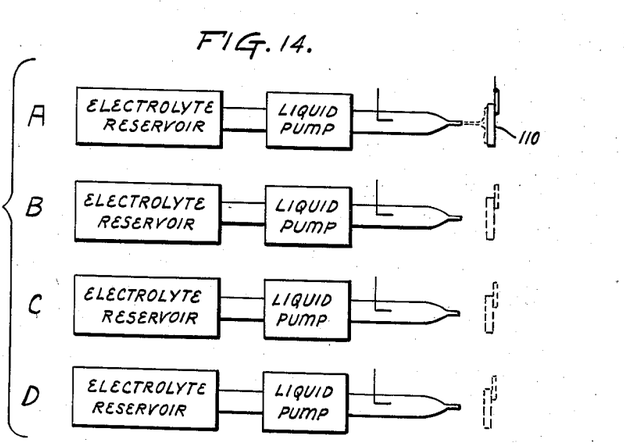
Figure 14 is a diagrammatic representation of apparatus for practising my fabricating method in one preferred embodiment.

When such variations are contemplated, the processing arrangement represented diagrammatically in Figure 14 is preferably employed. In this arrangement, four different stations supply jets of separately determinable characteristics, and the semiconductive body 110 is moved manually or mechanically from station A to B to C to D in order, to accomplish the desired sequence of treatments. At each station there is provided an arrangement of the type shown in Figure 13, although in Figure 14 the electrical supply circuits have not been shown.

Station A may be designated the etching station, B the surface-treating station, C the plating station and D the clean-up station. In the present example, the treatments at etching station A, plating station C and clean-up station D are standardized and held fixed, while only the parameters of the surface-treating station B are varied. Therefore the etching of the body 110 at station A to prepare a smooth, unstressed surface, the plating at station C to cover the contacting layer at least in part with metal, and the jet-electrolytic clean-up of the contact and surrounding surfaces at station D are the same for each contact. Variations in the quality of the contacts are therefore due to variations performed at the surface-treating station B.

Using this arrangement, I have found that variations in the nature of the electrolyte and electrolytic currents produced marked differences in the resultant diodes. By reversing the body 110 and applying the same process to the opposite side, a transistor of the form shown in Figure 15 may be produced, and the alpha of such transistors also vary markedly with variations of the surface-treatment at station B.

For example, using N-type germanium, an etching solution of 6 grams/liter of $K_2B_4O_7$ plus 5 cc./liter of $H_2SO_4$ and 5 cc./liter of ethylene glycol, a plating solution of 8 grams/liter of $ZnCl_2$ plus 6 cc./liter of HCl, and a clean-up etchant the same as that used for plating but with opposite polarity of electrolytic current, I have found that unusually excellent diodes and hole emitters may be obtained using a surface treatment consisting of anodizing with a jet of a .3 normal aqueous solution of KOH applied to the germanium surface prior to plating. By passing a current of 0.4 milliampere through the KOH jet for 10 seconds, particularly good diodes having back resistances of 6 megohms and forward resistances of 240 ohms are obtained, which do not break down in the back direction for voltages less than about 50 volts.

In general, I have found that cathodizing, without substantial plating in the surface-treatment step produces poorer electrical characteristics than with no current, and that anodizing usually improves the electrical characteristics.

The specific chemical potential, thickness and degree of activation of the contacting layer may be controlled by such means to produce layers having the required characteristics specified hereinbefore.

Figure 15:
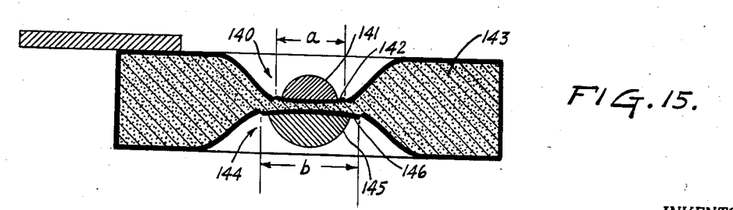
Figure 15 is a sectional view of an area-contact transistor utilizing my new form of area-contact for both emitter and collector.

In Figure 15, there is shown a complete transistor in which the invention is embodied as follows. Emitter contact 140 comprises conductive bulk portion 141 in area-contact with the contacting-layer 142 comprising the surface layer in the region a, which in turn is in intimate contact with the semi-conductive body 143. Layer 142 is constructed in accordance with the requirements for a superior emitter described hereinbefore. Collector contact 144 comprises a conductive bulk portion 145, a contacting layer 146 extending over the surface region b, and the underlying body of semiconductive material, where layer 146 is constructed in accordance with the above-specified requirements for a superior rectifier. The surface layer surrounding regions a and b is preferably neutral, i.e. has a specific chemical potential near that of the body 143 at least immediately adjacent to region a and b.

Although I have described my invention with particular regard to certain specific embodiments thereof, it will be understood that it is susceptible of embodiment in any of a wide variety of forms without departing from the spirit thereof.

I claim:

1. A semiconductive device comprising a body of semi-conductive material, a contacting layer of another material in direct, intimate engagement with a substantially unstrained surface region of said body, and a conductive body in area-contact with said layer, said layer having an effective specific chemical potential differing from the specific chemical potential of said semiconductive body by an amount at least as great as the difference between the energy-gap of said semiconductive body and the sum of 0.1 electron volt plus the energy-spacing of the Fermi level from the nearer band in the interior of the semiconductor.

2. As an emitter of minority-carriers into an N-type semiconductive body, a thin contacting layer of another material in direct, intimate engagement with an unstressed surface region of said body, and a body of conductive material in area-contact with said layer, the effective specific chemical potential of said layer exceeding the specific chemical potential of said semiconductive body by an amount at least as great as the energy gap of said semiconductive material minus 0.35 electron-volt.

3. The device of claim 2, in which said semiconductive body is of germanium, and said amount by which said effective specific chemical potential of said layer exceeds the specific chemical potential of said body is at least 0.37 electron-volt.

4. The device of claim 2, in which said semi-conductive body is of silicon, and said amount by which said effective specific chemical potential of said layer exceeds the specific chemical potential of said body is at least substantially 0.76 electron-volt.

5. As an emitter of minority-carriers into P-type semiconductive material, a body of P-type semiconductive material, a thin contacting layer of another material in direct, intimate engagement with said body, and a body of conductive material in area-contact with said layer, the effective specific chemical potential of said layer being less than the specific chemical potential of said body by an amount A at least as great as the energy gap for said material minus 0.35 electron-volt.

6. The device of claim 5, in which said semiconductive body is of silicon and said amount A is greater than substantially 0.76 electron-volt.

7. The device of claim 5, in which said semiconductive body is of germanium and said amount A is greater than substantially 0.37 electron-volt.

8. An asymmetrically-conductive device comprising a body of elemental semiconductive material, a thin layer of another material composed principally of one or more oxides of said semiconductive material in direct, intimate engagement with a substantially unstressed surface region of said body, and a conductive body in area-contact with said layer, said layer having an effective specific chemical potential differing from that of said body by an amount at least as great as substantially 0.6 electron-volt.

9. The device of claim 8, in which said body is of N-type material and said effective specific chemical potential of said layer exceeds the specific chemical potential of said body by at least 0.6 electron-volt.

10. The device of claim 8, in which said body is of P-type material and said effective specific chemical potential of said layer is less than the specific chemical potential of said body by at least 0.6 electron-volt.

11. In a method for forming a conductor-to-semiconductor contact by electrolytically etching a surface region of said body and subsequently electroplating a conductor material onto said surface region, the improvement which consists of treating said surface region immediately prior to said electroplating by applying an electrolyte to said surface region and simultaneously passing an electrical current between said electrolyte and said body in the anodizing direction, the density of said current being small compared with that employed during said electrolytic etching.

12. A method in accordance with claim 11 in which said treating electrolyte is applied in the form of a jet.

13. A method in accordance with claim 11 in which said treating electrolyte is basic.

14. A semiconductive device comprising a body of N-type semiconductive material, a layer of another material in direct, intimate engagement with a substantially unstressed surface of said body, and a body of conductive material in area-contact with said layer, said layer comprising a complex having a large density of unfilled, low-lying electron-energy states when out of contact with other materials and containing as a major component thereof an oxide substitutionally activated with a metal of the substitutional-acceptor type.

15. A semiconductive device comprising a body of P-type material, a thin layer in direct, intimate engagement with a substantially unstressed surface of said body, and a body of conductive material in area-contact with said layer, said layer comprising a complex having a large density of filled, high-energy electron-states when out of contact with other materials and containing as a major component thereof an oxide substitutionally activated with a metal of the substitutional-donor type.

References Cited in the file of this patent

UNITED STATES PATENTS

| | | |
|---|---|---|
| 2,560,792 | Gibney | July 17, 1951 |
| 2,563,503 | Wallace | Aug. 7, 1951 |
| 2,629,672 | Sparks | Feb. 24, 1953 |
| 2,644,852 | Dunlap | July 7, 1953 |
| 2,665,399 | Lingel | Jan. 5, 1954 |
| 2,686,279 | Barton | Aug. 10, 1954 |
| 2,725,505 | Webster et al. | Nov. 29, 1955 |

FOREIGN PATENTS

| | | |
|---|---|---|
| 1,037,293 | France | Apr. 29, 1953 |
| 1,038,658 | France | May 13, 1953 |
| 1,080,034 | France | May 26, 1954 |

OTHER REFERENCES

Tiley et al.: "Proceedings of the I.R.E.," vol. 41, No. 12, December 1953, pp. 1706–8.